June 15, 1926.
F. W. WATTS
CHAIN
Filed May 14, 1923
1,589,275
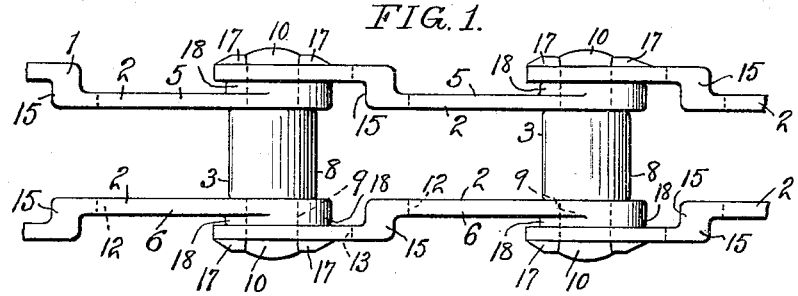
FIG. 1.
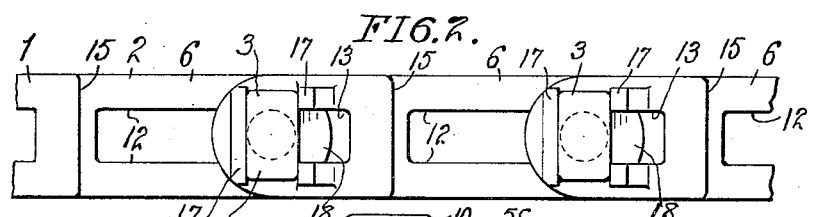
FIG. 2.
FIG. 4.
FIG. 5.
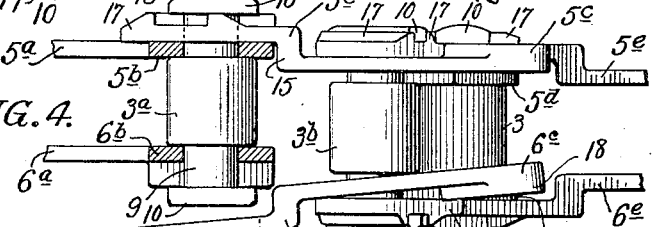
FIG. 3.
Inventor
FRANK W. WATTS.
F. DeWitt Goodwin
Attorney Patented June 15, 1926.

1,589,275

UNITED STATES PATENT OFFICE.

FRANK W. WATTS, OF PHILADELPHIA, PENNSYLVANIA.

CHAIN.

Application filed May 14, 1923. Serial No. 639,006.

My invention relates to improvements in chains, particularly sprocket chains having detachable links which permit inserting or removing links for lengthening or shortening the chain.

The object of the present invention is to form each link of the chain with a pair of side members which latter are similar to each other and interchangeable; a further object of my invention is to provide a pivot member adapted for connecting the links and for spacing the side members, forming the links, a uniform distance apart; a still further object of my invention is to provide interlocking means upon the side members and the pivot members by which the parts may be readily separated; a still further object of my invention is to construct each side member with an off-set portion whereby the narrow ends of one pair of side members will fit inside the broadened ends of the pair of side members forming the adjacent link in the chain, and a still further object of my invention is to locate the said off-set portion of the side members closer to one end of the link than to the other end, thus providing a long straight central portion in each side member throughout the narrowed portion of the link, whereby the side members will fit closely against the sides of the teeth of a sprocket wheel and insure the chain running freely upon said wheel, and the off-set portion will also limit the distance the links can move towards each other when the chain is slack and the links are in the same plane.

Referring to the accompanying drawing; Fig. 1, is a plan view of my improved chain; Fig. 2, is a side view of Fig. 1; Fig. 3, is a side view of the chain showing the links turned upon the pivot members into different planes for detaching the links; Fig. 4, is a horizontal section on line 4—4 Fig. 3; and Fig. 5, is a vertical section on line 5—5 Fig. 3.

In the accompanying drawing, in which like reference characters refer to like parts, 1 represents the chain formed of links 2, connected by the pivot members 3. Each link is formed of a pair of side members 5 and 6. The side members 5 and 6 are separable from each other and from the pivot members 3.

The pivot member 3 carries a spacing member 8 for holding the side members a uniform distance apart. Said pivot member 3 also has cylindrical bearing portions 9 for pivotally connecting adjacent links together and said pivot member is provided upon the ends with elongated heads 10.

The side members 5 and 6 each have elongated slots 12 and 13 formed therein to receive the cylindrical portions 9 of the pivot members 3 and through which slots the heads 10 of the pivot members may freely pass when turned into longitudinal alignment with said slots. Each side member 5 and 6 has an offset portion 15 so that one end of the link will fit inside, and the opposite end will fit outside of the next adjacent links and the corresponding ends of the several side members will be in alignment and properly fit upon a sprocket wheel.

The side members 5 and 6 are provided at one end with lugs 17 for holding the heads 10 of the pivot members crosswise of the slots 13 in the side members and the opposite end of each side member is provided with a boss 18, equal in thickness to the height of the lugs 17, so that when the links are extended the heads 10 of the pivot members are locked and cannot turn in the ends of the side members having the lugs 17 thereon, which engage said heads. The pivot member 3 is the proper length between the heads 10 to prevent the pivot members having any lateral movement in the links, when the latter are extended and separated by the bosses 18.

The links may be readily detached by turning them upon the pivot members 3 into different planes, as shown in Fig. 3, which permits the pivot members $3^a$ and $3^b$ to slide in the slots 12 of the side members $6^b$ and $6^c$, as shown in Fig. 3, until the off-set ends of the side members $6^c$ and $6^d$ are free from the bosses 18 on the narrowed ends of the members $6^b$ and $6^c$. The pair of side members $5^c$ and $6^c$, Fig. 4, can now be drawn together sufficiently to free the heads of the pivot member $3^a$ from the lugs 17, which permits the heads to be turned so as to pass through the slot 13 formed in the side members and thus free the side member $6^c$ from the pivot member $3^a$. The opposite side member $5^c$ of the link may be removed from the other end of the pivot member $3^a$ and by repeating this operation the other ends of the side members may be removed from the next pivot member. The off-set portion 15 of the side members is located closer to one end of the said member than to the other end. Said portion 15 acts as a stop to limit the distance the pivot member can slide in the slot 12, unless the adjacent side members are positioned at different angles. The longer portion of the side member permits the slot 12 to extend the necessary length for the pivot member to move therein and free the adjacent side member from the boss 18 and said longer portion also forms a link with side members which fit closely to the sides of the teeth of a sprocket wheel for guiding the chain upon the latter.

Having thus described my invention I claim and desire to secure by Letters Patent:

1. A chain comprising similar separable side members arranged in pairs forming links every complete link of which is the same, pivot members connecting adjacent ends of the pairs of side members spacing means for the side members carried by the pivot members, bosses upon the ends of the side members to prevent lateral movement of the pivot member, interlocking means for engaging the pivot member located upon the opposite ends of the side members from the said bosses and operative while said ends are in contact with the bosses of the side members of adjacent links to prevent disengagement with the pivot member, said side members having longitudinal slots formed therein to permit the movement of the pivot member into a position free of the said bosses whereby the pivot member may be released from the said interlocking means and the side members detached from the pivot member.

2. A chain comprising similar separable side members arranged in pairs forming links, each side member having an off-set portion within its length whereby a pair of side members forming a link will have a narrowed end and the opposite end will be broadened adapting the latter end of a link to embrace the narrowed end of a successive link to form the chain, pivot members for connecting successive links, said pivot member having means for holding the side members in spaced relation to each other, bosses upon the ends of the side member to prevent lateral movement of the pivot member, said side members having longitudinal slots formed therein through which the pivot members may move throughout a portion of the length of a link, said side members having the said off-set portion positioned closer to one end of the side member than to the other end thus forming a stop to limit the distance the pivot member may slide in the said slot formed in one end of the side member when the links are in the same plane and means for detachably interlocking the opposite end of the side members with the pivot members.

3. A chain comprising links, separable similar side members arranged in pairs forming said links, said side members having longitudinal slots formed in the ends thereof, pivot members having portions at either end thereof adapted to occupy said slots in the side members and connect successive side members together, an enlarged substantially round central part upon the pivot member adapted to hold the separable side members in spaced relation to each other, elongated heads upon the ends of the pivot members, a lug upon one end of a side member for engaging said head and holding it crosswise of said slot formed in the side member, and a boss upon the end of another side member adapted to hold the said lug of the adjacent side member in engagement with the head of the pivot member.

4. A chain comprising links, similar separable side members arranged in pairs forming said links, said side members having longitudinal slots formed in the ends thereof, pivot members having portions at either end thereof adapted to occupy said slots in the side members and connect successive side members together, an enlarged central part annular in cross section upon the pivot member adapted to hold the separable side members in spaced relation to each other, elongated heads upon the other ends of the pivot members, and means upon the side members operative in the normal position of the links for holding said head crosswise of the slots formed in the side members.

5. A chain comprising separable similar side members arranged in pairs forming links every complete link of which is the same, pivot members connecting adjacent ends of the pairs of side members spacing means for the side members carried by the pivot members, bosses upon the ends of the side members to prevent lateral movement of the pivot member, lugs upon the opposite ends of the side members from said bosses for engaging the pivot member, said side members having longitudinal slots formed therein to permit movement of the pivot member into a position free of the bosses, whereby the pivot member may be released from said lugs, and the side members detached from the pivot member.

In testimony whereof I affix my signature.

FRANK W. WATTS.